US008756223B2

(12) United States Patent
Ekstrand et al.

(10) Patent No.: US 8,756,223 B2
(45) Date of Patent: Jun. 17, 2014

(54) CONTEXT-AWARE SEARCH

(75) Inventors: Michael D. Ekstrand, Minneapolis, MN (US); Wei Li, Toronto (CA); Tovi Grossman, Toronto (CA); Justin Frank Matejka, Etobicoke (CA); George Fitzmaurice, Toronto (CA)

(73) Assignee: AUTODESK, Inc., San Rafael, CA (US)

( * ) Notice: Subject to any disclaimer, the term of this patent is extended or adjusted under 35 U.S.C. 154(b) by 241 days.

(21) Appl. No.: 13/049,517

(22) Filed: Mar. 16, 2011

(65) Prior Publication Data

US 2012/0239643 A1 Sep. 20, 2012

(51) Int. Cl.
*G06F 7/00* (2006.01)
*G06F 17/30* (2006.01)

(52) U.S. Cl.
USPC ............ 707/723; 707/727; 707/748; 707/822

(58) Field of Classification Search
USPC ........................................................ 707/723
See application file for complete search history.

(56) References Cited

U.S. PATENT DOCUMENTS

| | | | |
|---|---|---|---|
| 6,523,022 B1 | 2/2003 | Hobbs | |
| 7,603,349 B1* | 10/2009 | Kraft et al. | 1/1 |
| 2006/0167857 A1* | 7/2006 | Kraft et al. | 707/3 |
| 2008/0005067 A1 | 1/2008 | Dumais et al. | |
| 2008/0077558 A1* | 3/2008 | Lawrence et al. | 707/3 |
| 2008/0091650 A1* | 4/2008 | Fontoura et al. | 707/3 |
| 2008/0154855 A1* | 6/2008 | Balabhadrapatruni et al. | 707/3 |
| 2010/0094873 A1* | 4/2010 | Boal et al. | 707/737 |
| 2010/0211588 A1* | 8/2010 | Jiang et al. | 707/768 |
| 2010/0241647 A1* | 9/2010 | Ntoulas et al. | 707/765 |
| 2011/0055295 A1* | 3/2011 | Bhide et al. | 707/822 |
| 2011/0302149 A1* | 12/2011 | Vadlamani et al. | 707/711 |

OTHER PUBLICATIONS

Terry, et al., "ingimp: Introducing Instrumentation to an End-User Open Source Application" In Proceeding of the Twenty-Sixth Annual SIGCHI Conference on Human Factors in Computing Systems (Florence, Italy, Apr. 5-10, 2008. CHI '08. pp. 607-616.
International Search Report, PCT Application No. PCT/US2012/029558, dated Jun. 8, 2012.
Windows 95. Microsoft, "Self Help and Online Support Options", http://support.microsoft.com/kb/141128 (Nov. 2006) 9 pgs.
Agichtein, et al., "Learning User Interaction Models for Predicting web Search Result Preferences". In Proc. SIGIR 2006, 8 pgs.
Anand, et al., "Contextual Recommendation". In From Web to Social Web: Discovering and Deploying User and Content Profiles, 2007, 19 pgs.
Brandt, et al., "Example-Centric Programming: Integrating Web Search into the Development Environment". In Proc. CHI 2010, ACM (2010), 513-522. 10 pgs.

(Continued)

*Primary Examiner* — Binh V Ho
(74) *Attorney, Agent, or Firm* — Patterson & Sheridan, LLP

(57) ABSTRACT

One embodiment of the present invention sets forth a technique for supplementing user-specified text for a search with context information to generate search results that is more closely matched to the user's needs. A context search component maintains a snapshot of the user context and additional context-based queries are generated and corresponding searches are performed. The search results of the context-based queries are merged with the results of the user-specified text query and displayed for the user. When the user accesses a resource listed in the merged search results, the context-based terms mentioned in the resource are identified to the user.

23 Claims, 8 Drawing Sheets

(56) References Cited

OTHER PUBLICATIONS

Budzik, et al., "Anticipating and Contextualizing Information Needs". In Proc. Am. Soc. IS 1999, 14 pgs.
Coyle, et al., "Supporting Intelligent Web Search". In ACM Trans. Internet Technol. 7, 4 (2007), 31 pgs.
Dourish, P., "What We Talk About When We Talk About Context". In Personal Ubiquitous Comput. 8, 1 (2004), 12 pgs.
Farkas, D.K. "The Role of Balloon Help". In SIGDOC Asterisk J. Comput. Doc. 17, 2 (1993), 17 pgs.
Finkelstein, et al., "Placing Search in Context: the Concept Revisited". In ACM Trans. Inf. Syst. 20, 1 (2002), 9 pgs.
Goodall, S.D. "Online help: A Part of Documentation". In Proc. SIGDOC, ACM (1992), 169-174. 6 pgs.
Kraft, et al., "YIQ: Contextual Search at the Point of Inspiration". In Proc. CKM 2005, 816-823. 8 pgs.
Kraft, et al., "Searching with Context". In Proc. WWW 2006, 477-486. 10 pgs.
Lawrence, S. Context in web search. "Bulletin of the Technical Committee on Data Engineering.", (2000), 52 pgs.
Lee, W., "?": "A Context-Sensitive Help System Based on Hypertext". In Proc. ACM/IEEE DAC 1987, 429-435. 7 pgs.
Lieberman, et al., "Out of Context: Computer Systems That Adapt to, and Learn From, Context". In IBM Syst. J. 39, 3-4 (2000), 617-632. 16 pgs.
Myers, et al., "Answering Why and Why Not Questions in User Interfaces". In Proc. CHI 2006, ACM (2006), 397-406. 10 pgs.
Stallman, R.M. Emacs "The Extensible, Customizable Self-Documenting Display Editor". In Proc. Text Manip. 1981, 147-156. 10 pgs.
Tintarev, N. "Explanations of Recommendations". In Proc. RecSys 2007 Doct. Symp., 203-206. 4 pgs.
Wen, et al. "Probabilistic Model for Contextual Retrieval". In Proc. SIGIR 2004, 57-63. 7 pgs.
Winkels, R. User modelling in help systems. In Proc. CAL 1990, 184-193.

\* cited by examiner

CONTEXT-AWARE SEARCH

BACKGROUND OF THE INVENTION

1. Field of the Invention

Embodiments of the present invention relate generally to search operations and, more specifically, to searching based on a user's context.

2. Description of the Related Art

Users of complex software applications frequently need to consult documentation, tutorials, and support resources to learn how to use the software and further their understanding of its capabilities. More recently, internet-based documentation from software vendors, professional third parties, and users themselves have become more prevalent sources of software application documentation. Conventionally, help retrieval is initiated by a user through keyword searches. In order to locate the appropriate help, the user must know or be able to find the appropriate resource and hope that the resource is of sufficiently high quality to answer their question. They must also know the correct name for the functionality that they are seeking or terms used by people discussing the functionality when searching user-contributed resources.

As the foregoing illustrates, what is needed in the art is a technique for improving a user's ability to successfully search internet-based documentation.

SUMMARY OF THE INVENTION

When users of software application programs initiate a text-based search, the user-specified terms are supplemented with context information to generate search results that are more closely matched to the user's needs. A context search component maintains a snapshot of the user context and additional searches are performed using context-based queries generated by the context search component. Results of the context-based queries are merged for display to the user. When the user accesses a resource listed in the merged search results, context-based terms mentioned in the resource are identified.

One embodiment of the present invention sets forth a method for generating context-based queries. The method includes the steps of receiving a user-specified query including a user-specified term and extracting a context-based term from context data associated with an application program. A context-based query that includes the context-based term is generated and first search results for the user-specified query and second search results for the context-based query are received. The resources listed in the first search results and resources listed in the second search results are ranked to generate merged context-based search results. The merged context-based search results are displayed.

One advantage of the disclosed method is that it improves a user's ability to successfully search internet-based documentation by generating search results based on context information in combination with user-specified terms. The user's interaction with an application program contains a wealth of context information related to their needs: what menu items they have tried, what types of objects they are trying to manipulate, what panels and dialogs they have seen. This context information is used to generate search results that are more closely targeted to the user's particular situation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
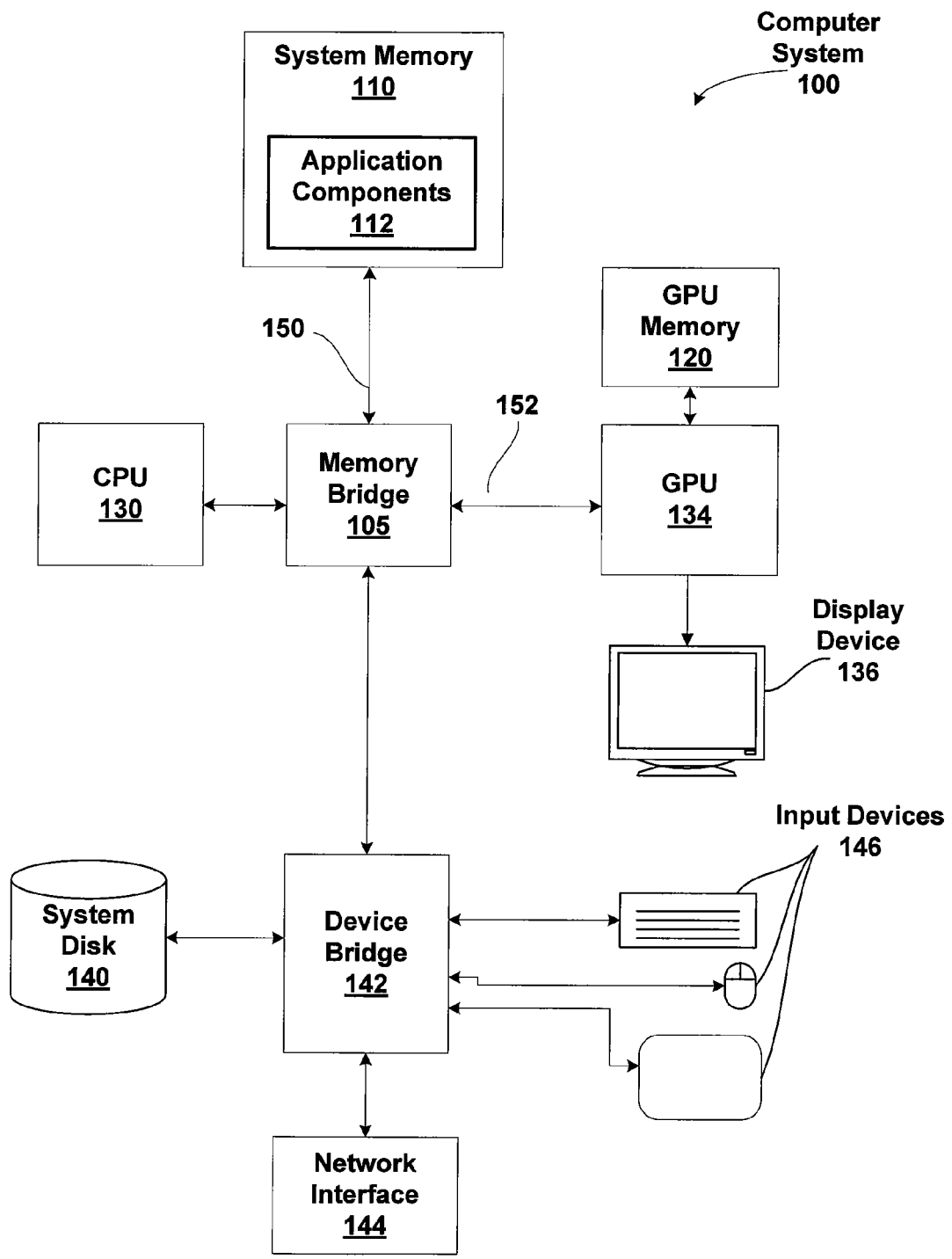
FIG. 1 illustrates a computer system configured to implement one or more aspects of the present invention.

FIG. 1 illustrates a computer system 100 configured to implement one or more aspects of the present invention. The computer system 100 includes, without limitation, a central processing unit (CPU) 130, a system memory 110, a graphics processing unit (GPU) 134, a GPU memory 120, a memory bridge 105, a display device 136, a system disk 140, a device bridge 142, a network interface 144, and input devices 146, e.g., a mouse, keyboard, touchpad, and the like. The display device 136 or a touchpad may be configured to use a capacitive sensing, camera generated images, or any other technology known to those skilled in the art to sense stylus and/or multi-finger input. In one embodiment, system memory 110 is configured to store application components 112 that are configured generate context-based searches and context-based search results.

The CPU 130 communicates with the system memory 110 via the memory bridge 105, which may be, e.g., a Northbridge device or subsystem. System memory 110 is configured to store application programs, as well as data used by or generated by the CPU 130. System memory 110 is coupled to the memory bridge 105 via a system memory bus 150. The memory bridge 105 is coupled to the GPU 134 via a GPU system bus 152. The GPU system bus 152 may comprise any technically feasible data interconnect, such as the well-known personal computer interconnect (PCI) express bus. The memory bridge 105 is also coupled to the device bridge 142 using an interconnect system such as PCI. The GPU 134 conventionally incorporates real time image rendering means for rendering both three-dimensional (3D) and two-dimensional (2D) images. The GPU 134 delivers pixel data to display device 136, which may comprise a conventional CRT or LCD display. The GPU 134 is coupled to the GPU memory 120 using a GPU memory bus 154. The GPU memory 120 may be configured to store data used by or generated by the GPU 134. Data stored within the GPU memory 120 passes through the GPU 134 and the memory bridge 105 when accessed by the CPU 130. In some embodiments, the integrated circuit implementing the CPU 130 may incorporate additional functional blocks, such as the memory bridge 105 and the device bridge 142. In alternative embodiments, the integrated circuit implementing the GPU 134 may incorporate additional functional blocks, such as the memory bridge 105 and the device bridge 142.

The device bridge 142 is coupled to a hard drive 140, a network interface 144, and input devices 146. The hard drive 140 provides mass storage of programs and data. The network interface 144 provides network connectivity to other computers using a local area network (LAN) interface using any suitable technology, such as Ethernet. The input devices 146 provide user input. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

Whenever a user initiates a search, the application components 112 are configured generate context-based searches and context-based search results. In particular, a user may search for help information pertaining to an application program associated with the application components 112. With rich help content being created and available on the web, such as tutorials, code examples, and videos, search engines play a leading role in organizing the help information for an application program. Moreover, software users interact more frequently with web browser than traditional pre-designed and self contained help systems that may be embedded in an application program and limited to return only content that is included within the help system. In a conventional system, when a user has a question and explicitly searches using a web-browser, the context related to the user's interaction with the application program and state of the application program is ignored. A conventional query will naively return the results of a text search, regardless of what the user is currently doing.

In order to provide the user with search results based not only on the user-specified text in the query, context information is combined with the user-specified textual queries to provide a more refined help search experience. The user's interaction with the program contains a wealth of information related to the user's needs, and may include menu items that the user has tried, types of objects the user is trying to manipulate, panels and dialogs that the user has seen. This contextual information is used to generate search results that are more closely targeted to the user's particular situation.

Figure 2A:
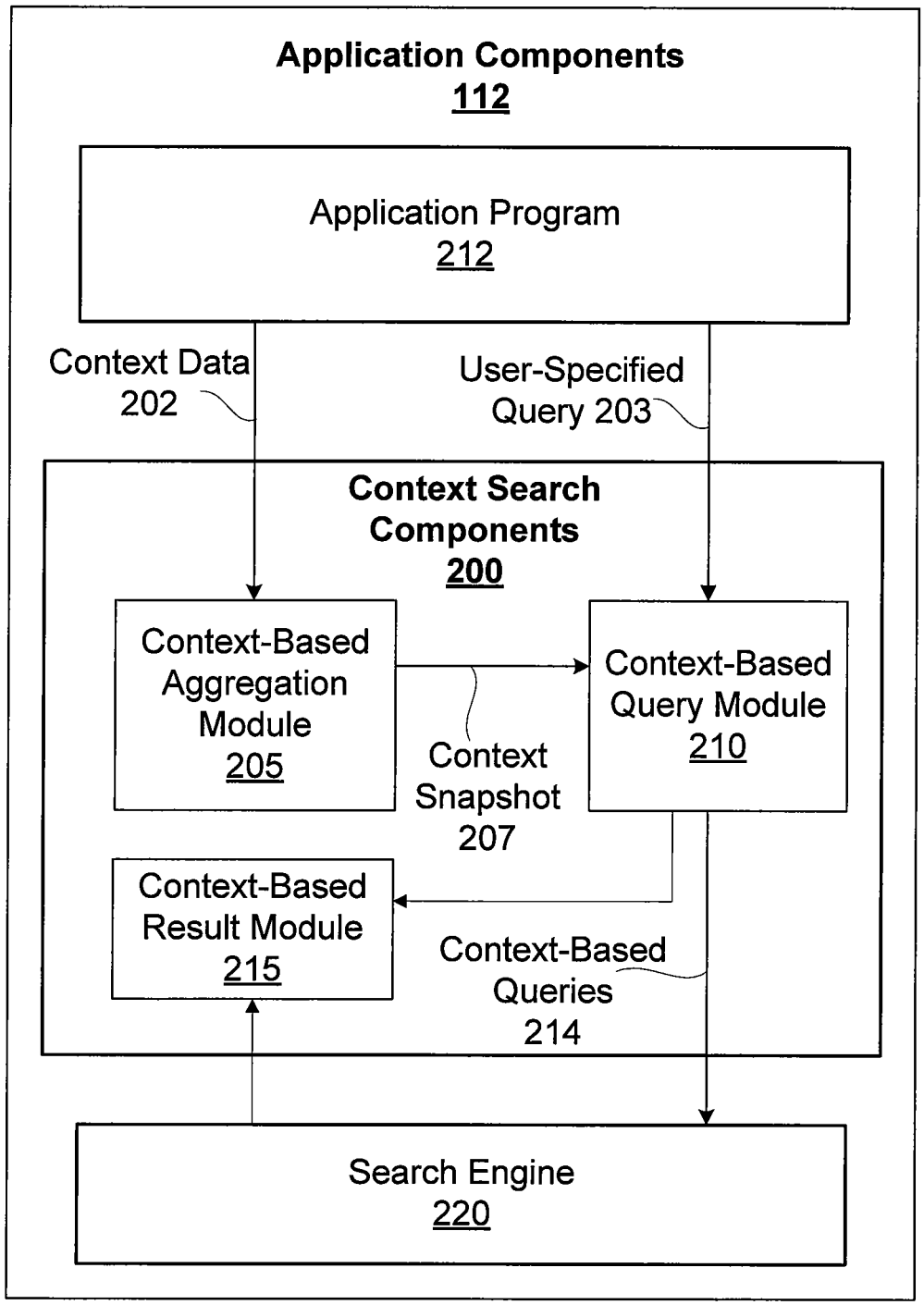
FIG. 2A illustrates the application components shown in FIG. 1, according to one embodiment of the invention.

FIG. 2A illustrates the application components 112 shown in FIG. 1, according to one embodiment of the invention. The application components 112 include an application program 212 and context search components 200. The context search components 200 are configured to interface with a search engine 220. In one embodiment the search engine 220 is a web-based search engine that enables searching over the internet. The application program 212 provides the context search components 200 with context data 202 and a user-specified query 203. The context search components 200 include a context-based aggregation module 205, a context-based query module 210, and a context-based result module 215.

Examples of context data 202 includes the last 5 active "selected tools" the last 5 editing actions as reported by the internal undo/redo architecture of the application program 212. More specifically, the context data 202 may include strings like "draw an ellipse", the titles of the currently open palettes, such as "Fill and Stroke", the types of the currently-selected objects. The user-specified query 203 includes text that may include a Boolean expression, phrase, keyword lists, or a combination of characters.

The user actions and application state changes are provided by the application program 212 as the context data 202. The context data 202 is stored and maintained by the context-based aggregation module 205. A context snapshot 207 is continuously maintained and provided to the context-based query module 210 when a user query 203 is received by the context based query module 210. The context-based query module 210 generates context-based queries 214 using the user query 203 and the context snapshot 207. The context-based queries 214 may include the user-specified query 203 in addition to additional queries that are generated based on the user query 203 and the context snapshot 207.

The context-based query module 210 may be configured to generate a new query by concatenating a query relevant to the particular contextual data (such as "select tool" when the user has selected the Select tool). When the user-specified query 203 does not contain the name of the application, the name may be prepended to the user-specified query 103 and each generated context-based query. The context-based query module 210 may request N results for each of the context-based queries 214, including the user query 203.

The use of context data 202 has the potential to improve the ability of a search system to meet users' information needs for software help by performing searches using the context-based queries 214 and also through the display of the search results. The context-based result module 215 merges the results of each one of the context-based queries 214 that is generated from a user-specified query 203. The results are sorted by the context-based result module 215 and displayed to the user. In some cases, the context-based result module 215 may be configured to restrict the scope of the search engine 220 to only return results that are specific to the application program 212. For other elements that are retrieved by the search engine 220, such as document contents, it may be more appropriate to simply favor documents mentioning portions of the user's context. Context could also provide a valuable additional data point for resolving synonymy and polygamy issues for documents retrieved by the search engine 220. The context data 202 may also be used by the context-based result module 215 to relate the context of retrieved documents that are viewed by the user to the application program 212 and current context.

Figure 2B:
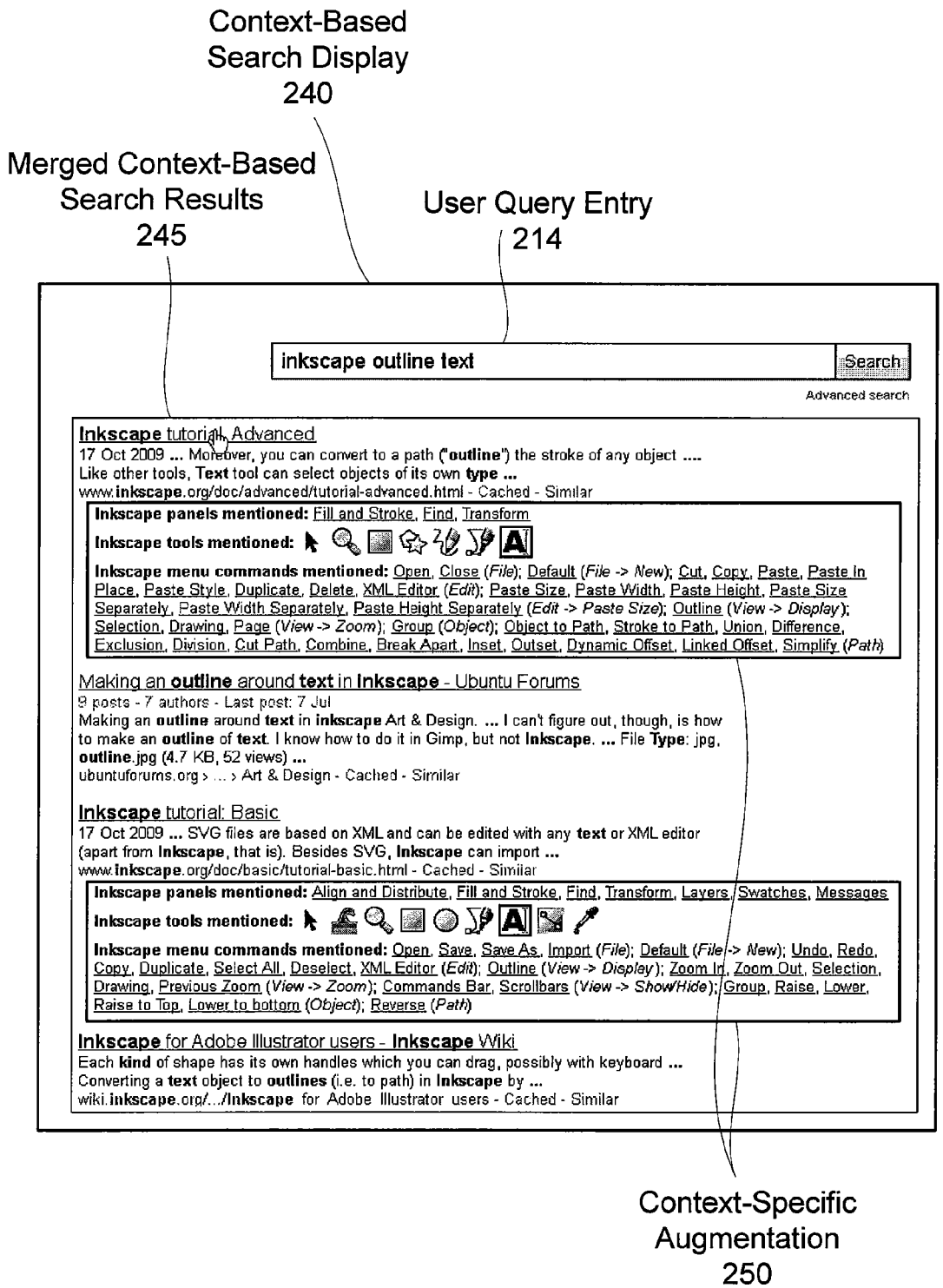
FIG. 2B illustrates a context-based search display, according to one embodiment of the invention.

FIG. 2B illustrates a context-based search display 240, according to one embodiment of the invention. The user query entry 214 is a field in which the user types the user-specified query 203. In one embodiment the field for entering the user query entry 214 is displayed within a window generated by the application program 212 and the context-based search display 240 is opened when the user initiates the search. When the user initiates the search, the context search components 200 generate the context-based queries 214 and initiate searches for each query in the context-based queries 214. The search engine 220 returns the search results for the context-based queries 214 and the context search components 200 ranks and merges the various resources that are returned by the search, generating the merged context-based search results 245. The context search components 200 may also be configured to generate the context-specific augmentation 250. The context-specific augmentation 250 relates the merged context-based search results 245 to the current context, enabling users to better identify useful results, or at least make better use of the merged context-based search results 245.

As shown in FIG. 2B, the context-specific augmentation 250 lists the panels specific to the application program 212 that a retrieved document mentions and illustrates the icons associated with the tools that are mentioned and are also specific to the application program 212. The context-specific augmentation 250 also lists commands specific to the application program 212 that are mentioned in a retrieved document in order to the user more readily use the document.

Searching using context-based queries 214 clarify user help requests by using the context data 202 without necessarily constructing a comprehensive model of user behavior. Ideally, the context data 202 would be everything that the context search components 200 would need to know about the user, their situation, the domain, and anything else in order to return exactly the context-based search results that are relevant to the user-specified query 203. In order to best approximate the ideal contextual information, the context data 202 that is generated by the application program 212 is not simply a fixed set of facts describing the background of a particular action, but also includes information related to a cyclical relationship between the context and actions because the context induces actions which give rise to more context. Contextual cues may be used either to infer other, unobservable contextual factors influencing a computation or directly to approximate true context-awareness.

Various observable cues and unobservable elements that are related to a user's context and may be relevant to search for help relevant to the application program 212 may be detected and provided as the context data 202. The cues are categorized by type, scope, and visibility as shown in TABLE 1.

TABLE 1

Context Cue Categories
Context Cues

| Type | Scope | Visibility |
|---|---|---|
| State | System | Inferred |
| Action | Application | Observable |
| | Document | |
| | Domain | |
| | User | |
| | Environment | |

The type category of context cues includes states and actions. States are snapshots of a portion of the system at a particular point in time: the current contents of a document and current screen resolution are both states. Actions are modifications to state made by the user, the system, or some external agent. Drawing a square, deleting text, and plugging in a graphics tablet are all actions. Actions result in new states; states and actions can therefore be thought of a nodes and edges, respectively, in a graph representing the user's changing context.

The distinction between states and actions allows states and the means by which those states were reached to be treated separately. For example, when a user's document contains a single square, that state could have been reached by having a square drawn on an empty document or by a circle being deleted from a document containing the circle and the square. While some information needs may depend only on the current state, others are influenced by the preceding actions.

The scope category on contextual cues includes the system-level context that pertains to the user's computer system as a whole, independent of any particular application program: the operating system and version, configured hardware, installed applications, and the like. The application-level context is related to the particular application the user is using, including the current display state and application modes, open palettes and dialogs, the currently selected tool, and the like.

Document cues and domain cues in the scope category are related to the work that the user is currently doing. Document cues relate to the work as it is represented in the application: the objects making up the user's data file and the actions performed on those objects. The domain cues relate to the meaning of the system and the system components in the context of the user's work domain. The scope category also includes the user-level context cues such as user states and actions that affect the user's information needs. The user cues can include current knowledge of the program and other factors. Some observable cues may help in assessing elements of the scope category cues, such as using browsing behavior to identify what types of documents a user finds most helpful. Finally, the environmental context may include a physical source object that the user is trying to model, or whether there are others in a physical area who would be distracted by playing a tutorial video.

Some of the contextual cues may not be directly observable by the application program 212 or a help system that is included in the application components 112. For example, system, application, and document cues are directly observable by the application program 212. Domain, user, and environmental context typically must be inferred from observable cues or proxies. For example, at the user scope, the system cannot directly observe the user's knowledge or goals, but some observable cues may help in assessing elements of this scope, such as using clicking behavior to identify interesting webpages.

Figure 3A:
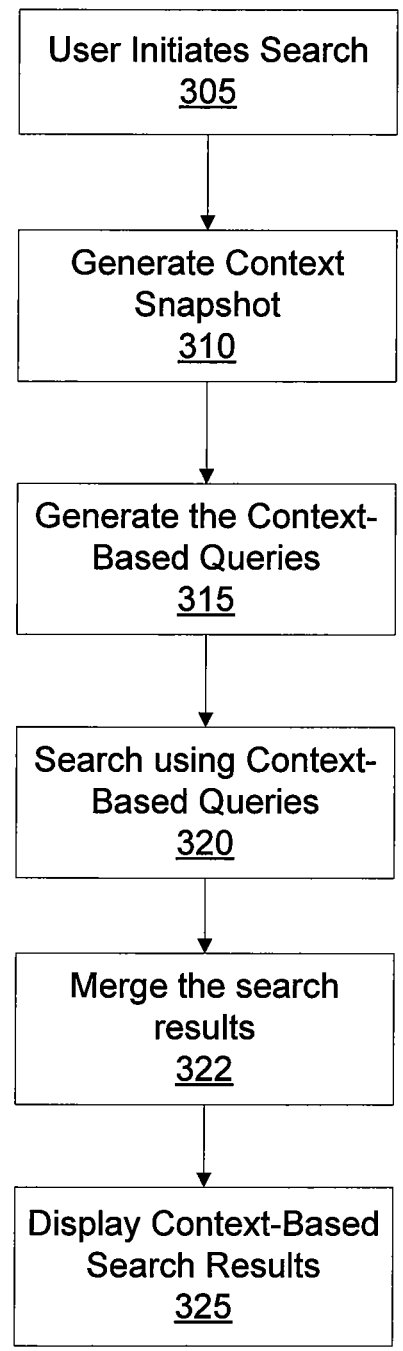
FIG. 3A illustrates a flow diagram of method steps for generating context-based search results, according to one embodiment of the invention.

FIG. 3A illustrates a flow diagram of method steps for generating context-based search results, according to one embodiment of the invention. Although the method steps are described in conjunction with the system of FIGS. 1 and 2A, persons skilled in the art will understand that any system configured to perform the method steps, in any order, is within the scope of the invention.

The method begins in step 305, when a user initiates a search by entering a user-specified query 203. In one embodiment the user-specified query 203 is related to the particular application program 212. The user-specified query 203 is received by the context—based query module 210. At step 310 the context-based aggregation module 205 continuously maintains a context snapshot 207 using the context data 202 provided by the application program 212. The context snapshot 207 includes terms extracted from the context data 202 and is output to the context-based query module 210. The terms may be tool names, panels that are open or have been recently accessed, recently executed commands, and the like.

At step 315 the context-based query module 210 generates one or more context-based queries 214, where the context-based queries 214 includes the user-specified query 203. The context-based queries 214 are generated using the user-specified query, the name of the particular application program 212, and the context data 202, as described in conjunction with FIG. 3B. At step 320 the context-based query module 210 outputs the context-based queries 214 to the search engine 220 to produce search results for each query in the context-based queries 214. At step 322 the context-based result module 215 receives the search results and merges the search results. The context-based result module 215 uses a weighting and scoring technique to merge the results of the context-based queries and produce context-based search results, as described in conjunction with FIG. 3C. At step 325 the context-based search results are displayed by the application components 112.

A score is computed for each result, e.g., resource that is returned for a search. The resources may include links to web content such as articles, videos, images, audio data, and the like. The score is used to rank the resources that are returned for each of the different context-based queries 214 when the resources are merged. The merged context-based search results 245 lists the different resources in a ranked order. Each user-specified query 203 $q_i$ is assigned a weight $w_i$. If the query contains the name of the application program 212, then the query is assigned a weight of 0.5. Otherwise, a weight of 0.2 is assigned to the user-specified query 203 and a context-based query is generated by pretending the name of the application program 212 to the user-specified query 203. The generated query is assigned a weight of 0.3. In one embodiment, a generated query that was previously performed and returns a resource that was accessed by a user is assigned a higher weight than the weight determined based only on the current user's context snapshot 207.

Additional context-based queries 214 are generated using terms extracted from the context data 202. Each term is assigned a weight and the weight of a particular context-based query is determined as the weight of the term included in the query. For a query including multiple terms, all the terms are combined with contextual items to create new query. Table 2 describes the intermediate weights given to each context-based query that is generated by the context-based query module 210.

TABLE 2

Context Data Weight Assignment

| Component | Weight |
|---|---|
| Event contexts | $\frac{1}{2^i}$ for the ith most recent context (i = 1 for the current context) |
| Editing actions | Same as event contexts |
| Open palettes | 1 |
| Selected object types | $\sum_{i=0}^{n-1} \frac{1}{2^i}$ Where n is the number of objects of that type selected |

Each search that is performed for a context-based query returns a list of resources that are merged into a single list where each resource appears in a ranked order. The resources in the list are ranked according to a computed score that is a function of the ranking of a resource in the search results returned from the search engine 220 and the weight of the context-based query that produced the search results. A resource, c is assigned a score $s_i(c)$ for each context-based query $q_i$. If c is not included in the first N resources that are returned by the search engine 220 for $q_i$, then $s_i(c)=0$; if c appears at position j within the search results returned by the search engine 220, $s_i$ is computed using the following formula:

$$s_i(c) = \frac{1}{2^{\frac{j-1}{\alpha-1}}} \qquad \text{Equation (1)}$$

Equation (1) is an exponential decay formula that is derived from the half-life utility metric in order to prevent pages that match multiple queries and that only appear deep in result lists from out-ranking more relevant pages that score very highly for only one or two queries. Using $\alpha=10$, the default length of a conventional search result, causes a resource at position j=10 to have a score of 0.5 and causes the scoring function to be nearly linear over the first page of results. Each resource's cumulative score s(c) is computed as the weighted sum $s(c)=\Sigma_i w_i s_i(c)$ of its per-results list scores. The resources in the merged context-based search results 245 are ranked in non-increasing (e.g., 0.5, 0.4, 0.4, 0.3, 0.2) order of resource score s(c).

Figure 3B:
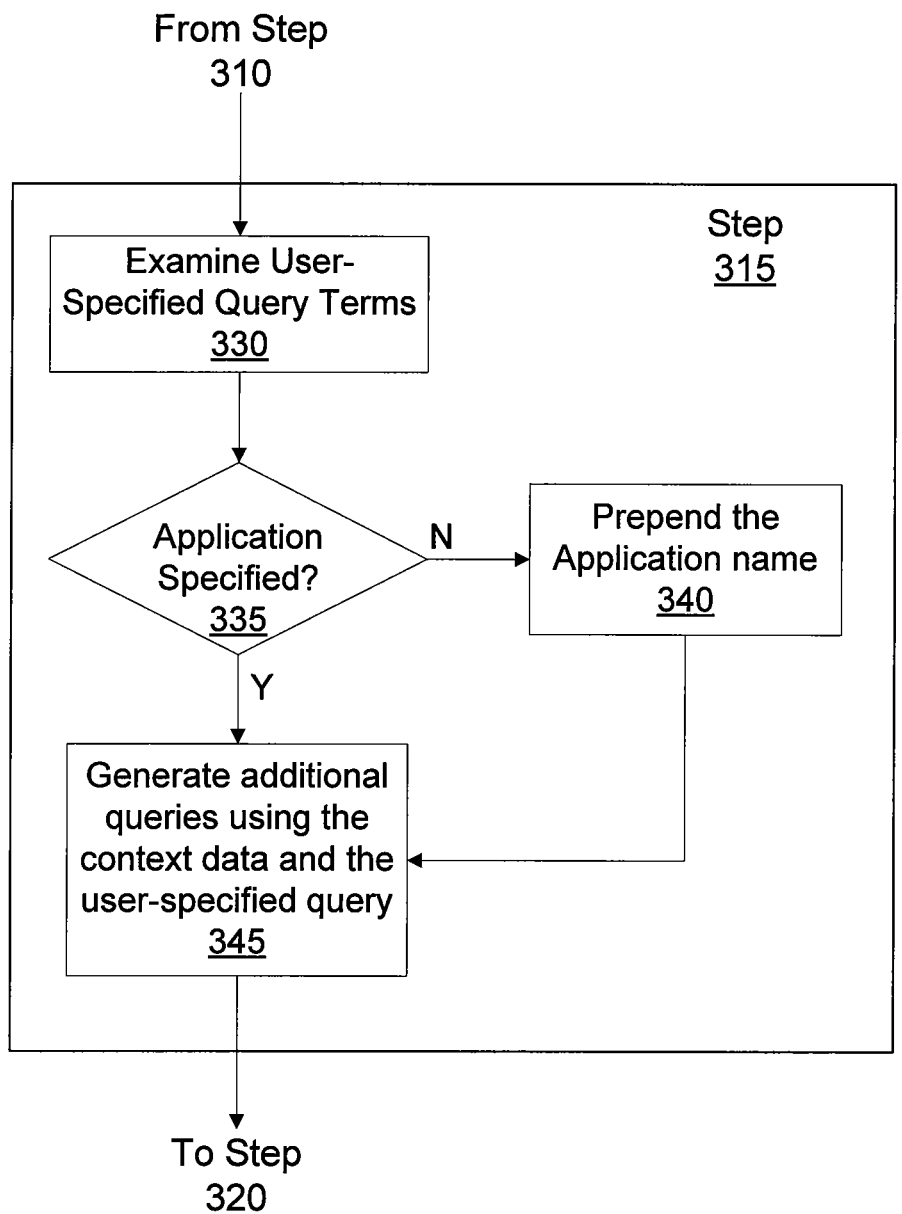
FIG. 3B illustrates details of a step of the flow diagram shown in FIG. 3A, according to one embodiment of the invention.

FIG. 3B illustrates details of step 315 of the flow diagram shown in FIG. 3A, according to one embodiment of the invention. At step 330 the context-based query module 210 examines the terms in the user-specified query 203. At step 335, the context-based query module 210 determines if the name of the application program 212 is specified, and, if so, the context-based query module 210 proceeds directly to step 345. Otherwise, the context-based query module 210 pretends the name of the application program 212 to the user-specified query 203 to generate a context-based query. At step 345 the context-based query module 210 generates additional queries using terms in the user-specified query 203, the name of the particular application program 212, and the context data 202.

Figure 3C:
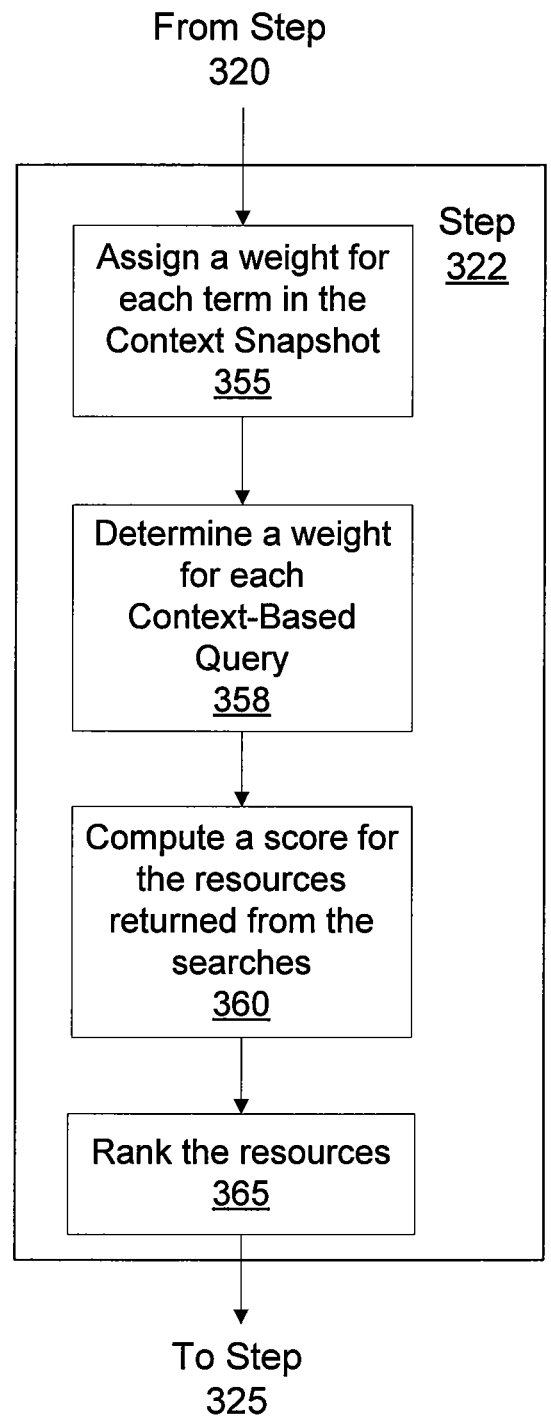
FIG. 3C illustrates details of another step of the flow diagram shown in FIG. 3A, according to one embodiment of the invention.

FIG. 3C illustrates details of step 322 of the flow diagram shown in FIG. 3A, according to one embodiment of the invention. At step 355 the context-based query module 210 assigns a weight for each term extracted from the context snapshot 207. At step 358 the context-based query module 210 determines a weight for each context-based query and provides the weights to the context-based result module 215. At step 358 the context-based result module 215 receives the search results, e.g. resource list, corresponding to each context-based query in the context-based queries 214 and computes a score for each resource. At step 360 the context-based result module 215 computes a score for each resource that is returned by the search engine 220 for a context-based query. At step 365 the context-based result module 215 ranks the resources based on the computed scores to generate the merged context-based search results 245. The context-based result module 215 may also insert the context-specific augmentation 250 into the merged context-based search results 245.

In one embodiment, the queries that are generated by the context-based query module 210 at step 345 are displayed to the user and the user may prioritize individual queries or disable individual queries. The user may then initiate the search so that only the enabled context-based queries are performed. The user-specified prioritization may change the weight that is assigned to a query, increasing the weight for queries whose priority is increased and reducing the weight for queries whose priority is decreased. In one embodiment, the context-based query module 210 is also configured to assign a higher weight to a context-based query that has been performed before and that returned a resource which was accessed by a user. In another embodiment, the terms that are extracted from the context snapshot 207 are displayed to the user and the user may enable or disable individual terms or adjust the weights assigned to each term. The context-based query module 210 may then generate the context-based queries 214 using only the enabled terms.

Figure 4A:
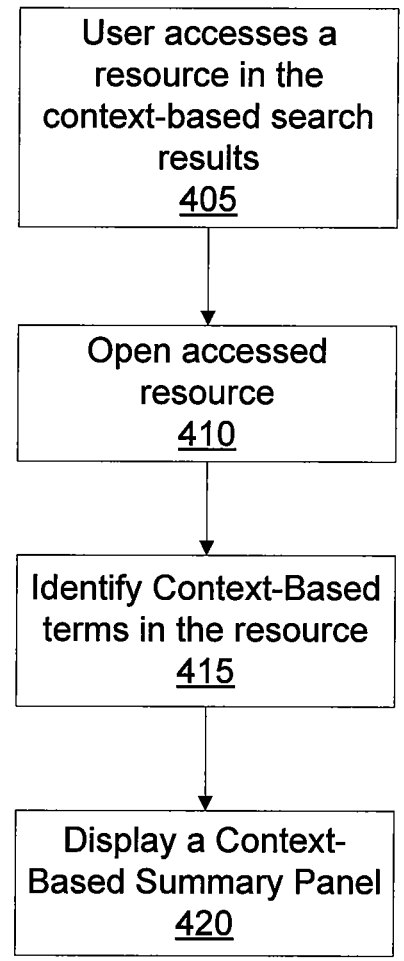
FIG. 4A illustrates is a flow diagram of method steps for displaying a context-based summary panel, according to one embodiment of the invention.

FIG. 4A illustrates is a flow diagram of method steps for displaying a context-based summary panel, according to one embodiment of the invention. The merged context-based search results 245 are displayed for the user and the user may then access individual resources in the merged context-based search results 245. At step 405 the user accesses a resource in the merged context-based search results 245. At step 410 the accessed resource is opened, i.e., a new window is opened to display the contents of the accessed resource or the contents of the context-based search display 240 are replaced with the contents of the accessed resource. At step 415 the terms that were included in the context-based queries 214, e.g., context-based terms, are identified in the accessed resource. At step 420 a context-based summary panel is displayed. The context-based summary panel illustrates the icons associated with the tools that are mentioned in the accessed resource. The context-based summary panel also lists commands and other functions specific to the application program 212 that appear in the accessed resource.

Figure 4B:
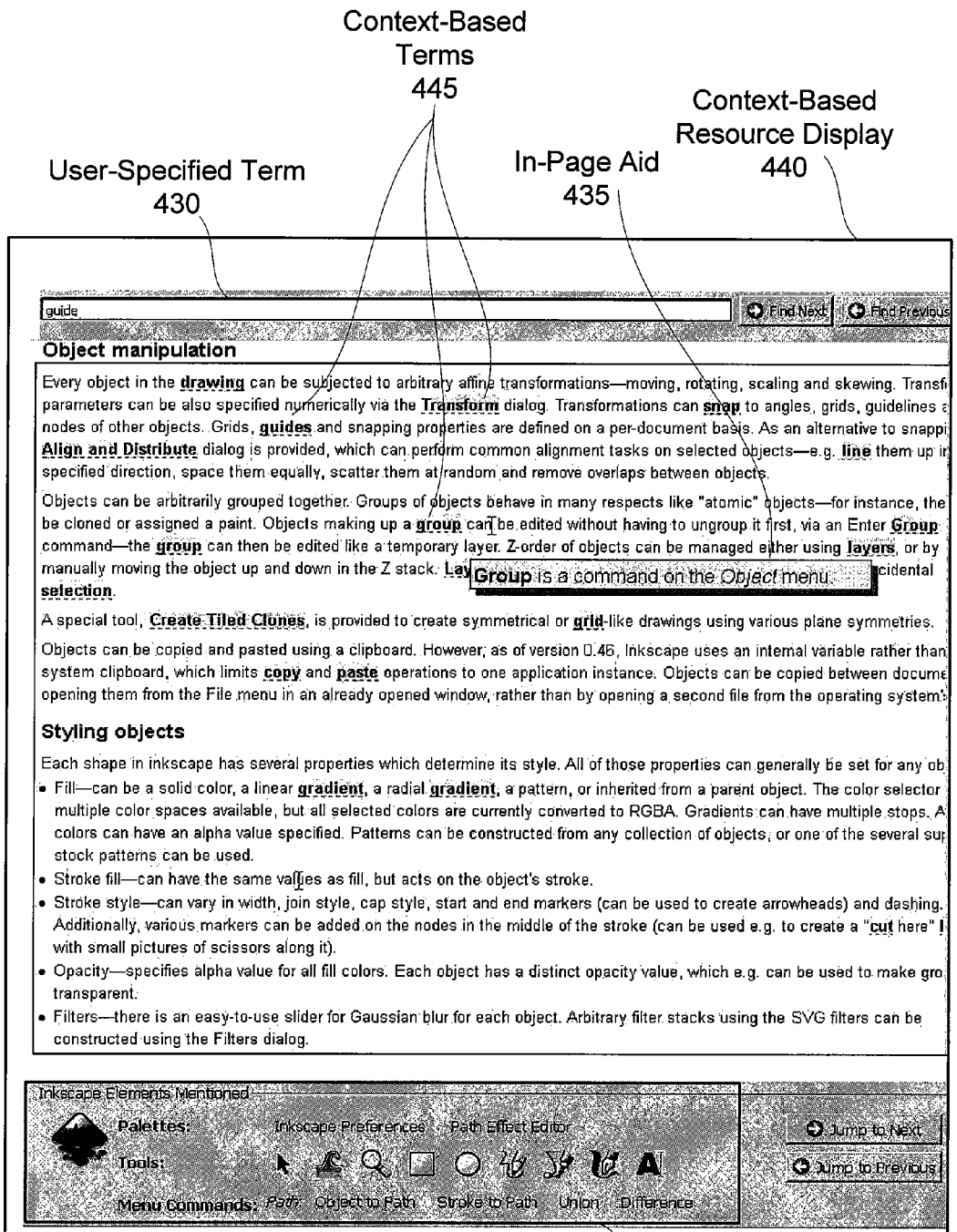
FIG. 4B illustrates a context-based page display, according to one embodiment of the invention.

FIG. 4B illustrates a context-based resource display 440, according to one embodiment of the invention. A user-specified term 430 may be entered and displayed in a field and terms in the accessed resource that match the user-specified term 430 are indicated by highlighting and/or bolding. The context-based terms 445 extracted from the context snapshot 207 may also be indicated by highlighting and/or bolding. The summary panel 450 is generated by searching the accessed resource for names of elements specific to the application program 212 and synonyms for those elements, e.g., such as "line tool" for the line and curve tool. Palettes that are currently open for the application program 212 are indicated in bold face and the current tool's icon may be surrounded with a black box. Each item listed in the summary panel 450 is also a hyperlink to the first mention of that term in the accessed resource.

In one embodiment, mentions of the elements included in the summary panel 450 are also indicated by highlighting. Hovering over a highlighted element, such as "group" generates the display of an in-page aid 435 that describes the "group" command and where to find the command in the interface for the application program 212. When the user selects an interface element, e.g., tool icon, palette, or command, in the summary panel 450, all mentions of the icon or element in the accessed resource may be highlighted and a browser tool may jump to the next mention. The "Jump to Next" and "Jump to Previous" buttons jump to the next and previous mention of a selected interface element, allowing the user to navigate to portions of the accessed resource that are most relevant to their task.

In sum, a technique is disclosed for enhancing help searches related to an application program with context information derived from a user's behavior inside the application program and the search terms specified by the user. One advantage of the disclosed method is that it improves a user's ability to successfully search internet-based documentation by generating search results based on the context information in combination with user-specified text. In contrast a conventional help search within an application program only searches for a user-specified term within the application program rather than searching resources accessed via the internet and a conventional help search does not generate search results based on context information.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for generating context-based queries, the method comprising:
    receiving a user-specified query that includes a user-specified term;
    extracting a context-based term from context data associated with an application program, wherein the context data includes one of an indication of a state change associated with the application or an indication of an action triggered by a user interacting with the application;
    generating a context-based query that includes the context-based term by combining the user-specified query with the context-based term;
    receiving first search results for the user-specified query and second search results for the context-based query; and
    ranking resources listed in the first search results and resources listed in the second search results to generate merged context-based search results.

2. The method of claim 1, further comprising:
    determining a first weight for the user-specified query based on the user-specified term; and
    determining a second weight for the context-based query based on the context-based term.

3. The method of claim 2, further comprising:
    computing a score for each one of the resources listed in the first search results based on the first weight and relative positions of the resources listed in the first search results; and
    computing a score for each one of the resources listed in the second search results based on the second weight and relative positions of the resources listed in the second search results.

4. The method of claim 3, wherein the step of ranking comprises ordering the resources listed in the first search results and the resources listed in the second search results based on the scores computed for the resources.

5. The method of claim 1, further comprising:
    opening a first resource listed in the merged context-based search results; and identifying appearances of the context-based term in the first resource.

6. The method of claim 5, further comprising displaying a context-based summary panel that illustrates elements associated with the application program that appear in the first resource.

7. The method of claim 1, further comprising displaying the merged context-based search results by displaying a context-specific augmentation that relates the merged context-based search results to a current context associated with the application program.

8. The method of claim 7, wherein the context-specific augmentation comprises icons associated with tools that are specific to the application program and appear within resources listed in the merged context-based search results.

9. The method of claim 7, wherein the context-specific augmentation comprises commands that are specific to the application program and appear within resources listed in the merged context-based search results.

10. The method of claim 1, further comprising determining that the user-specified query does not include an application name corresponding to the application program, and prepending the application name to the context-based query.

11. A non-transitory computer-readable medium including instructions that, when executed by a processing unit, cause the processing unit to generate context-based queries, by performing the steps of:
receiving a user-specified query that includes a user-specified term;
extracting a context-based term from context data associated with an application program, wherein the context data includes one of an indication of a state change associated with the application or an indication of an action triggered by a user interacting with the application;
generating a context-based query that includes the context-based term by combining the user-specified query with the context-based term;
receiving first search results for the user-specified query and second search results for the context-based query; and
ranking resources listed in the first search results and resources listed in the second search results to generate merged context-based search results.

12. The computer-readable medium of claim 11, further comprising:
determining a first weight for the user-specified query based on the user-specified term; and
determining a second weight for the context-based query based on the context-based term.

13. The computer-readable medium of claim 12, further comprising:
computing a score for each one of the resources listed in the first search results based on the first weight and relative positions of the resources listed in the first search results; and
computing a score for each one of the resources listed in the second search results based on the second weight and relative positions of the resources listed in the second search results.

14. The computer-readable medium of claim 13, wherein the step of ranking comprises ordering the resources listed in the first search results and resources listed in the second search results based on the scores computed for the resources.

15. The computer-readable medium of claim 11, further comprising:

opening a first resource listed in the merged context-based search results; and
identifying appearances of the context-based term in the first resource.

16. The computer-readable medium of claim 15, further comprising displaying a context-based summary panel that illustrates elements associated with the application program that appear in the first resource.

17. The non-transitory computer-readable medium of claim 11, further including instructions that when executed by the processing unit, cause the processing unit to display the merged context-based search results by displaying a context-specific augmentation that relates the merged context-based search results to a current context associated with the application program.

18. The computer-readable medium of claim 17, wherein the context-specific augmentation comprises icons associated with tools that are specific to the application program and appear within resources listed in the merged context-based search results.

19. The non-transitory computer-readable medium of claim 11, further including instructions that when executed by the processing unit, cause the processing unit to determine that the user-specified query does not include an application name corresponding to the application program, and prepend the application name to the context-based query.

20. The non-transitory computer-readable medium of claim 11, wherein combining the user-specified query with the context-based term comprises concatenating the user-specified query with the context-based term.

21. A computing system configured to generate context-based queries, comprising:
a memory configured to store an application program and context data associated with the application program; and
a processor that is configured to:
receive a user-specified query that includes a user-specified term;
extract a context-based term from the context data, wherein the context data includes one of an indication of a state change associated with the application or an indication of an action triggered by a user interacting with the application;
generate a context-based query that includes the context-based term by combining the user-specified query with the context-based term;
receive first search results for the user-specified query and second search results for the context-based query;
rank resources listed in the first search results and resources listed in the second search results to generate merged context-based search results; and
output the merged context-based search results to a display device.

22. The computing system of claim 21, wherein the processor is further configured to display the merged context-based search results by displaying a context-specific augmentation that relates the merged context-based search results to a current context associated with the application program.

23. The computing system of claim 21, wherein the processor is further configured to determine that the user-specified query does not include an application name corresponding to the application program, and prepend the application name to the context-based query.

* * * * *